(12) United States Patent
Gattrell

(10) Patent No.: US 8,801,932 B2
(45) Date of Patent: Aug. 12, 2014

(54) SUB-CRITICAL PARTIAL OXIDATION FOR TREATMENT OF NITRATION WASTES

(75) Inventor: Michael Gattrell, Vancouver (CA)

(73) Assignee: Noram International Limited, Dublin (IE)

( * ) Notice: Subject to any disclaimer, the term of this patent is extended or adjusted under 35 U.S.C. 154(b) by 470 days.

(21) Appl. No.: 13/319,886

(22) PCT Filed: May 14, 2010

(86) PCT No.: PCT/CA2010/000736
§ 371 (c)(1),
(2), (4) Date: Nov. 10, 2011

(87) PCT Pub. No.: WO2010/130049
PCT Pub. Date: Nov. 18, 2010

(65) Prior Publication Data
US 2012/0055872 A1    Mar. 8, 2012

Related U.S. Application Data

(60) Provisional application No. 61/178,914, filed on May 15, 2009.

(51) Int. Cl.
*C02F 9/00* (2006.01)
*C02F 3/00* (2006.01)
*C02F 1/02* (2006.01)
*C02F 1/72* (2006.01)

(52) U.S. Cl.
USPC .......... 210/631; 210/758; 210/759; 210/761; 210/903; 210/909

(58) Field of Classification Search
CPC .............. C02F 1/025; C02F 1/20; C02F 1/66; C02F 1/72; C02F 1/722; C02F 1/727; C02F 1/78; C02F 9/00; C02F 3/00; C02F 11/08; C02F 11/086; C02F 2101/345; C02F 2209/08; C02F 2209/16; C02F 2301/066
USPC ......... 210/601, 631, 754, 756, 758, 759, 760, 210/761, 903, 909; 588/317, 320, 408, 414
See application file for complete search history.

(56) References Cited

U.S. PATENT DOCUMENTS

| 2,665,249 A | 1/1954 | Zimmermann |
| 4,230,567 A | 10/1980 | Larbig |
| 5,250,193 A * | 10/1993 | Sawicki et al. ............... 210/761 |

FOREIGN PATENT DOCUMENTS

| CA | 1063739 | 10/1979 |
| EP | 1132347 A2 | 9/2001 |
| EP | 1172336 A2 | 1/2002 |

OTHER PUBLICATIONS

Guenkel, A. A., "Nitrobenzene and Nitrotoluene", J. J. McKetta and W. A. Cunningham (Ed.), Encyclopedia of Chemical Processing and Design, Marcel Dekker Inc., New York, (1990) 165-188.
Dugal, M. "Nitrobenzene and Nitrotoluenes", Kirk-Othmer Encyclopedia of Chemical Technology, 5th Ed., vol. 17, John Wiley & Sons, Inc. (Oct. 14 2005).
Mishra, V.S. et al, "Wet Air Oxidation", Ind. Eng. Chem. Res., 34 (1995) 2-48.
Kolaczkowskia, S. T. et al., "Wet air oxidation: a review of process technologies and aspects in reactor design", Chemical Engineering Journal 73 (1999) 143-160.
Santarini, G. and Boos, J. Y., "Corrosion of Austenitic Stainless Steels in Hot Concentrated Aqueous NaOH Solutions", Corrosion Science 19 (1979) 261-281.
Pray, H. A. et al., "Solubility of Hydrogen, Oxygen, Nitrogen, and Helium in Water at Elevated Temperatures", Ind. Eng. Chem. 44(5) (1952) 1146-1151.

* cited by examiner

*Primary Examiner* — Lucas Stelling
(74) *Attorney, Agent, or Firm* — Oyen Wiggs Green & Mutala LLP

(57) ABSTRACT

A process for treating wastewater containing nitro-hydroxy-aromatic compounds using oxidative sub-critical conditions. The wastewater to be treated is adjusted to contain excess hydroxide equivalent to greater than three moles of free hydroxide per mole of total nitro-hydroxy-aromatic compounds, and a sub-stoichiometric amount of an oxidant is supplied to the wastewater. The nitro-hydroxy-aromatic compounds may include nitro-phenol salts or nitro-cresol salts.

24 Claims, No Drawings

SUB-CRITICAL PARTIAL OXIDATION FOR TREATMENT OF NITRATION WASTES

REFERENCE TO RELATED APPLICATION

This application claims the benefit under 35 U.S.C. §119 of U.S. Application No. 61/178,914 filed 15 May 2009 and entitled SUB-CRITICAL PARTIAL OXIDATION FOR TREATMENT OF NITRATION WASTES, the entirety of which is hereby incorporated by reference.

TECHNICAL FIELD

This invention relates to thermal oxidative treatments for a nitration wastewater for breaking down nitrogen-containing compounds such as nitro-hydroxy-aromatic compounds. In embodiments, subsequent biotreatment is facilitated. Aspects of the invention provide processes involving thermal treatment and processes involving thermal treatment, optional ammonia stripping, and biotreatment, and associated apparatus.

BACKGROUND

The following references are hereby incorporated by reference herein in their entirety:
1. A. A. Guenkel, "Nitrobenzene and Nitrotoluene", in J. J. McKetta and W. A. Cunningham (Ed.), "Encyclopedia of Chemical Processing and Design", Marcel Dekker Inc., New York, (1990) 165-88.
2. M. Dugal, "Nitrobenzene and Nitrotoluenes", in "Kirk-Othmer Encyclopedia of Chemical Technology, 5th Ed., Vol. 17", John Wiley & Sons, Inc., (Oct. 14 2005).
3. W. Larbig, "Process for working up effluents containing nitro-hydroxy-aromatic compounds", U.S. Pat. No. 4,230,567 (1980).
4. J. B. Joshi et al, "Wet Air Oxidation", *Ind. Eng. Chem. Res.,* 34 (1995) 2-48.
5. S. T. Kolaczkowskia, P. Plucinskia, F. J. Beltranb, F. J. Rivasa, D. B. McLurgh, "Wet air oxidation: a review of process technologies and aspects in reactor design", *Chemical Engineering Journal* 73 (1999) 143-160.
6. F. J. Zimmermann, "Waste Disposal", U.S. Pat. No. 2,665,249, (1950).
7. G. Santarini and J. Y. Boos, "Corrosion of Austenitic Stainless Steels in hot concentrated aqueous NaOH solutions", *Corrosion Science,* 19 (1979) 261-81.
8. H. A. Pray, C. E. Schweickert and B. H. Minnich, "Solubility of Hydrogen, Oxygen, Nitrogen, and Helium in Water at Elevated Temperatures", *Ind. Eng. Chem.,* 44(5) (1952) 1146-51.

These references are pertinent to the general state of the art.

During the production of nitrobenzenes and nitrotoluenes small amounts of nitrated partially oxidized by-products are formed (1,2). For production of nitro-benzenes, these nitrated partially oxidized by-products can include compounds such as: mono-nitrophenol, di-nitrophenol, tri-nitrophenol (picric acid), as well as small amounts of nitro-organic acids and poly-nitro-phenols. For production of nitro-toluenes, similar cresol (methyl-phenol) compounds are produced. Because of their partial oxidation, these compounds are more water soluble than the desired nitrated benzene or toluene products, especially when in their salt form. These compounds can therefore be removed from the desired products by washing with alkaline water. While such washing procedures are very effective at providing a clean product chemical, they also generate a wastewater stream contaminated with the partially oxidized nitrated by-products (sometimes referred to as "red water" in the industry due to its pronounced color).

While many wastewater treatment methods are available, biological treatment typically offers considerable cost advantages over other methods. Unfortunately, red water type wastewater is toxic to typical biotreatment systems due to the presence of high concentrations of nitro-hydroxy-aromatic compounds. As used herein, "nitro-hydroxy-aromatic compound" means aromatic compounds having both hydroxyl- and nitro-functional groups, where other groups such as alkyl-groups may or may not also be present. One approach that has been widely adopted within the industry is an anoxic thermal treatment as described in U.S. Pat. No. 4,230,567 (2,3). This approach involves heating the nitro-hydroxy-aromatic compounds in their salt form to 150-500° C. with exclusion of air/oxygen at a pressure of 50-150 bars with a hold time of 5-120 minutes. This anoxic treatment can result in a thermal decomposition of the nitro-hydroxy-aromatic compounds, reducing their concentration to below 20 ppm and thus producing a wastewater that is amenable to biotreatment. The subsequent biotreatment must then remove a significant level of organic carbon (as measured by chemical oxygen demand "COD" or biological oxygen demand "BOD") and dissolved nitrogen compounds. The suitability of wastewater for subsequent biotreatment can be assessed by examining the BOD/COD ratio.

However, while the nitro-hydroxy-aromatic compounds can be reduced to below 20 ppm, many other organic compounds remain. While these other compounds are much less toxic than nitro-hydroxy-aromatic compounds, some care must be taken in their biotreatment to allow the bacterial population to adapt to the particular mix of compounds and to ensure that the concentrations to which the bacteria are exposed are within their tolerance levels. Normally, at a large chemical facility this is easily handled by blending with other, more easily bio-treated waste streams at a central biotreatment facility, which produces a more benign wastewater and helps to average out variations. However, for a stand alone plant with the output of a treatment system directly coupled to a dedicated biotreatment facility the mix of chemicals in the wastewater and the resulting bio-treatability becomes very important. In such a case, the biotreatment facility must be oversized and carefully designed to allow for upstream process upsets that could lead to higher concentrations of less bio-treatable compounds and even then care must be taken in the operation of the combined system. Thus, a method to more fully treat the wastewater to improve its bio-treatability would be desirable.

An alternative method that could more completely treat the waste solutions is the use of wet-ox (4,5,6). Wet-ox is an air or oxygen fed subcritical oxidation technology for treatment of industrial waste waters containing high concentrations of organic carbon. As a subcritical technology, it operates somewhat below the critical point of water (374° C. and 221 bar) with typical conditions of 125-320° C. and 50-200 bar (4). In theory, through such a high temperature oxidative approach, the level of organic carbon in the wastewater could be decreased by oxidizing it to carbon dioxide. However, as disclosed in U.S. Pat. No. 4,230,567, the additional air or oxygen tends to interfere with the degradation reactions of the nitro-hydroxy-aromatic compounds. This has been reported to result in a treated solution retaining much more than 20 ppm of remaining nitro-hydroxy-aromatic compounds, rendering it non-bio-treatable.

There is a need for practical and cost-effective processes and apparatus for treating water containing organic materials. There are particular needs for such processes that treat waste water containing nitrogen-containing organic compounds such as nitro-hydroxy-aromatic compounds.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One embodiment provides a process for treating wastewater containing nitro-hydroxy-aromatic compounds using sub-critical conditions. The wastewater to be treated is adjusted to contain excess hydroxide equivalent to greater than three moles of free hydroxide per mole of total nitro-hydroxy-aromatic compounds, and a sub-stoichiometric amount of an oxidant is supplied to the wastewater. The hydroxide may be sodium hydroxide. The oxidant may be oxygen. In some embodiments, the process has additional steps of ammonia stripping and/or biotreatment following the oxidative thermal treatment.

In addition to the exemplary aspects and embodiments described above, further aspects and embodiments will become apparent by reference to the drawings and by study of the following detailed descriptions.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

It has now been found that a wet-ox-type treatment can be used to provide a treated wastewater solution that is suitable for subsequent biotreatment by using sub-stoichiometric amounts of oxygen. An example embodiment treats waste water to yield a bio-treatable effluent. Advantageously, in embodiments, reaction conditions may produce an effluent with improved properties, specifically a lower residual COD, a lower concentration of dissolved nitrogen compounds and a higher bio-treatability (BOD/COD) than effluents from currently available processes. This decreases the required level of biotreatment, allowing for a smaller biotreatment plant and/or allowing the biotreatment plant to be better protected from upstream process upsets.

Through testing, it has been found that the addition of an appropriate amount of sodium hydroxide (or some other source of hydroxide) along with a sub-stoichiometric amount of oxygen (or equivalent oxidant) can produce an effluent with less than 20 ppm of remaining nitro-hydroxy-aromatic compounds (and so be bio-treatable), and a decrease in the level of organic carbon requiring biotreatment. The resulting mix of organic compounds in effluent so treated is also more easily bio-treated than effluent from an anoxic thermal treatment. A further unexpected result is that this choice of conditions produces a sufficiently mild oxidative environment within the high temperature and pressure reactor that lower cost metals, such as stainless steel, can be used for parts of the reactor that contact process fluids. In addition, in some embodiments the chosen operating conditions include conditions where single phase operation can be relatively easily achieved, which provides some technical advantages for the reactor design and operation.

In an example embodiment, processes as described herein are applied to treat waste waters containing by-products formed during the nitration of aromatic compounds to produce nitrobenzenes or nitrotoluenes. Example embodiments use high temperature partial oxidation (using a sub-stoichiometric amount of oxygen), under sub-critical (180-374° C.), alkaline conditions (greater than 3 moles of free hydroxide per mole of total nitro-hydroxy-aromatic salts, e.g. >0.6 wt % free sodium hydroxide per 1 wt % of sodium dinitrophenolate salts) to convert a bio-toxic wastewater to a biodegradable (i.e. bio-treatable) wastewater. The biodegradable waste water may have, for example, <20 ppm remaining nitro-hydroxy-aromatic compounds. The use of such conditions can reduce the corrosiveness encountered during the high temperature oxidative treatment, allowing the use of treatment reactors made using lower-cost materials.

The inventors' testing has shown that different reaction pathways can be achieved through the proper selection of reaction conditions. One non-limiting exemplary hypothetical embodiment relates to the treatment of dinitrophenol. Under anoxic thermal treatment (as described in U.S. Pat. No. 4,230,567) ammonia is a primary product of the treatment:

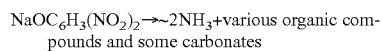
pounds and some carbonates [1]

The inventors have shown that under wet-ox conditions (i.e. in the presence of excess oxygen) a reaction approaching the following reaction may be obtained (if sufficient caustic is used):

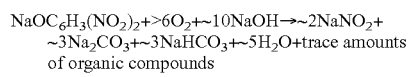
of organic compounds [2]

Small amounts of organic compounds remain and the dissolved nitrogen is present predominately as nitrite. The foregoing approach requires a large amount of oxygen and NaOH and, typically, handling of a two phase gas-liquid mixture in the reactor. Further, it was found that carrying out this reaction resulted in severe corrosion of the stainless steel reactor, indicating that a reactor of a more expensive alloy would be required.

The inventors have now found that carrying out a wet-ox type treatment using a small, controlled amount of oxygen can yield significant benefits. The inventors have found that the reactions of oxygen under the conditions disclosed herein are relatively slow, which surprisingly leads to a highly advantageous selectivity in the resulting oxidation reactions. In some embodiments one or more of the following benefits may optionally be achieved: oxidation of compounds that are problematic for bio-treatment; effective use of oxygen by avoiding reactions with compounds that are easily bio-treated; avoiding oxidative (trans-passive) corrosion of stainless steel. These results can be described by Equation 3 below for the example of sodium dinitrophenolate salt. This preferred operating condition is described herein as using a sub-stoichiometric amount of oxygen. As used herein, a stoichiometric amount is defined as the amount of oxygen to completely oxidize the nitro-hydroxy-aromatic compounds to ammonia and carbon dioxide/bicarbonate/carbonate (as, for example, in Equation 3). This partial wet-ox treatment results in a lower requirement for oxygen and NaOH than a traditional wet-ox treatment (as can be seen by comparing Equations 2 and 3), more readily allows for one phase reactor operation and also produces a treated effluent stream that is more easily bio-treated than that from the anoxic thermal treatment. Further, it was found that the use of sub-stoichiometric amounts of oxygen avoided the corrosion of the stainless steel reactor, avoiding the requirement for a reactor made of a more expensive alloy. An example of such a sub-stoichiometric oxidation for dinitrophenol would be:

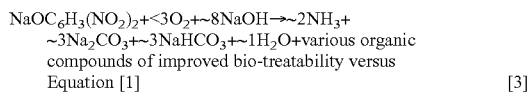
~3Na$_2$CO$_3$+~3NaHCO$_3$+~1H$_2$O+various organic compounds of improved bio-treatability versus Equation [1]      [3]

An additional potential advantage results from the finding that even with oxygen present, if sub-stoichiometric treatment is used, the starting nitrogen is reacted predominantly to ammonia. Because ammonia is somewhat volatile, unlike the nitrite produced in a regular wet-ox approach (see Equation 2), the partial wet-ox treatment may optionally be followed with an ammonia stripping step before biotreatment to remove at least a portion of the ammonia.

Different amounts of NaOH from those indicated in Equations 2 and 3 can be used, which will shift the distribution of carbonate/bicarbonate from that shown, and for very low amounts can also result in ammonium carbonate and ammonium bicarbonate. However, too little NaOH (<3 moles per total moles of nitro-hydroxy-aromatic salts) was found to result in lower bio-treatability of the resultant treated wastewater. If a stainless steel reactor is used, an upper limit on the NaOH is set by safety considerations. Continued operation with improper combinations of NaOH concentration and temperature can lead to stress corrosion cracking of stainless steels (7), a hazardous condition that can cause sudden catastrophic failure of pressure equipment. The experimental examples presented herein are for the purposes of illustrating the effect of reaction conditions on the treatment of the nitro-hydroxy-aromatic compounds. The examples also show the influence of reaction conditions on what appears to be transpassive corrosion of stainless steel. However, the range of conditions used for the examples should not be taken to indicate safe conditions for continuous operation of a stainless steel reactor in relation to stress corrosion cracking.

The degree of bio-treatability of a solution can be gauged by the ratio of BOD/COD (biological oxygen demand/chemical oxygen demand). A solution containing a mixture of organic compounds that can be easily oxidized by bacteria will result in close to the same biological oxygen demand as found for oxidation of the same solution by a strong chemical oxidant (chemical oxygen demand) and so the BOD/COD will approach 1 (typically reaching around 0.9). For a solution that is difficult to biologically oxidize or is bio-toxic, a lower BOD/COD will be found (typically <~0.2).

The different results found for anoxic, wet-ox and partial wet-ox operating conditions can be further understood by reference to the examples. Examples 1, 4 and 5 show anoxic tests that successfully remove the nitro-hydroxy-aromatic salts to below 20 ppm in a reasonable time. The resulting solutions are typically dark red-brown, contain about 40% of the starting COD and are reasonably bio-treatable, having a BOD/COD ratio around 0.53. Note that the decrease in the COD is due the fact that the ammonia formed in the thermal treatment reactions (Equation 1) is essentially inert to the COD measurement and so is missed. Therefore, decreases of COD beyond this point with oxygen addition are an indication of true or net oxidation.

In Example 2, conditions similar to Example 1 were used, but excess oxygen was added. While the COD removal was greatly improved, the time for removal of the nitro-hydroxy-aromatic salts to the target 20 ppm was actually slowed from 29 minutes after reaching temperature in Example 1 to 43 minutes in Example 2. This is consistent with U.S. Pat. No. 4,230,567, which teaches that effective removal of nitro-hydroxy-aromatic salts requires excluding oxygen and using an anoxic approach. However, as shown in Example 3, the inventors have found that through the use of additional caustic, the inhibiting effect of oxygen on the removal of the nitro-hydroxy-aromatic salts can be overcome. In Example 3, with an increase in caustic, the time for removal of the nitro-hydroxy-aromatic salts to the target 20 ppm was restored to around 19 minutes after reaching temperature. This result opens the door to the effective use of wet-ox type approaches to treat these wastewaters. However, the strong oxidizing conditions used were found to lead to strong corrosion of the stainless steel reactor. Thus, it appears that such an approach would require a reactor made using a more expensive alloy. Also, large amounts of oxygen are required, likely also requiring a treatment system design to operate with two phase (gas-liquid) flow. Thus, a more selective treatment approach would be advantageous.

The inventors have shown, e.g. with reference to Examples 6-9, for nitro-hydroxy-aromatic salts, that the use of a partial wet-ox treatment can avoid the corrosion problems found with normal wet-ox, enable the use of reactor single phase flow (see below) and produce a treated wastewater of lower COD and improved bio-treatability versus anoxic treatment (having a higher BOD/COD of 0.60). In Examples 10 and 11, similar results are shown for nitrocresol type nitro-hydroxy-aromatic salts. The addition of a sub-stoichiometric amount of oxygen (Example 11) produces a treated wastewater of lower COD and higher BOD/COD ratio as compared to the anoxic case (Example 10). In Example 12, a lower temperature operation is shown.

Without limiting any potential theories of operation, it may be that the enhancement of bio-treatability with sub-stoichiometric amounts of oxygen disclosed herein is due to the selective removal of quinone type compounds, which are known to react with oxygen under sufficiently alkaline conditions. This explanation would also be consistent with the production of lighter, tan colored treated solutions with the partial wet-ox versus darker, red-brown solutions with anoxic thermal treatment. Quinone compounds and other more difficult to biodegrade ring-structured organic compounds are often colored versus simple organic acids which are colorless and more easily biodegraded. The reaction conditions disclosed herein allow the judicious use of oxygen for removing problematic, colored organic compounds and leaving the easier to bio-degrade organic acids to be handled by lower cost biotreatment.

The specific conditions that have been found to provide these benefits are in the sub-critical temperature range from 180° C. to 374° C., preferably from 200° C. to 350° C., and most preferably from 240° C. to 320° C. The most preferred range of temperatures would result in water vapor pressures from about 30 bar to 115 bar, with preferred operating pressures from about 80 bar to 180 bar (the water vapor pressure forming a component of the operating pressure, as discussed below). The amount of sodium hydroxide is at least 3 moles of NaOH per total moles of nitro-hydroxy-aromatic compounds and preferably at least 4 moles of NaOH per total moles of nitro-hydroxy-aromatic compounds. Note that other sources of hydroxide such as potassium hydroxide could also be used. A substoichiometric amount of an oxidant such as oxygen is used, as described below.

The stoichiometric reactions for partial wet-ox conditions as defined herein provide an amount of oxygen sufficient to oxidize the mono-, di-, and tri-nitrophenol salts to ammonia (i.e. as oppose to nitrite for the full wet-ox) and carbon dioxide/bicarbonate/carbonate, and can be written as follows:

NaOC$_6$H$_4$NO$_2$+<5O$_2$+~8NaOH→~1NH$_3$+
~3Na$_2$CO$_3$+~3NaHCO$_3$+~3H$_2$O+various organic
compounds of improved bio-treatability versus
Equation [1]     [4]

NaOC$_6$H$_3$(NO$_2$)$_2$+<3O$_2$+~8NaOH→~2NH$_3$+
~3Na$_2$CO$_3$+~3NaHCO$_3$+~1H$_2$O+various organic
compounds of improved bio-treatability versus
Equation [1]     [3]

NaOC$_6$H$_2$(NO$_2$)$_3$+<1O$_2$+~8NaOH+~1H$_2$O→~3NH$_3$+
~3Na$_2$CO$_3$+~3NaHCO$_3$+various organic compounds of improved bio-treatability versus Equation [1]     [5]

Thus it can be seen that for nitrophenol salts the stoichiometric amount of oxygen is given by:

[O$_2$]=7[NPs]−2[R—NO$_2$]     [6]

where: [O$_2$] is the oxygen concentration, [NPs] is the total concentration of nitrophenol salts, and [R—NO$_2$] is the total concentration of nitro groups on the nitro-hydroxy-aromatic salts (i.e. the number of nitro groups on each nitro-hydroxy-aromatic salt times its concentration). The range of operation for partial wet-ox is then from 33% to 99% of the above stoichiometric amount, with the preferred range being from 67% to 95%.

In a similar manner, for nitrocresol salts (a class of nitro-hydroxy-aromatic compounds which have a methyl group), the stoichiometric amount of oxygen is given by:

[O$_2$]=8.5[NCs]−2[R—NO$_2$]     [7]

where: [NCs] is the total concentration of nitrocresol salts.

As discussed previously, such a partial oxidation system also has the ability to be run as a single phase. To achieve this, the operating pressure should be sufficiently high to fully dissolve the added oxygen and maintain a single phase. For example, for 6.5 g/L oxygen at 320° C., the oxygen can be fully dissolved if a partial pressure of oxygen is maintained at about 40 bar (8). The partial pressure of water at 320° C. is about 115 bar and so an applied pressure of around 155 bar would be sufficient to fully dissolve the required oxygen in the waste water solution. As another example, a 1 wt % dinitrophenol salt solution would have a concentration of 0.0485 M, which from Equation 6 gives a stoichiometric oxygen loading of 0.146 M. Using 90% of the stoichiometric oxygen would require 0.131 M or 4.2 g/L of oxygen. For 4.2 g/L oxygen at 300° C., the oxygen can be fully dissolved if a partial pressure of oxygen is maintained at about 31 bar (8). The partial pressure of water at 300° C. is about 86 bar and so a total applied pressure (i.e. operating pressure) of around 116 barg would be sufficient to fully dissolve the required oxygen in the wastewater solution. These conditions avoid problems with gas-liquid mixing in the reactor, possible salt precipitation due to vaporization of water, the potential for dangerous volatile organic plus oxygen gas phase mixtures, and allow for the use of a simpler reactor discharge flow controller.

Similar results can be obtained by replacing oxygen with other oxidants such as hydrogen peroxide or nitrite as long as the correct stoichiometry is followed. For example, one mole of oxygen could be replaced by 2 moles of hydrogen peroxide or by 0.67 moles of nitrite. However, testing with hydrogen peroxide found that while it was better at removing COD than an equivalent amount of oxygen, it appeared to be less selective in its oxidation and so was not as effective in increasing the BOD/COD ratio.

An example apparatus provides a reaction pressure vessel and a heater capable of heating contents of the pressure vessel to temperatures in the range of 200° C. to 400° C. A process controller is configured to control introduction of hydroxide and an oxidant and to maintain process conditions as described herein. In some embodiments a biotreatment reactor is located downstream from the pressure vessel. In some embodiments, an apparatus for stripping ammonia is located downstream from the pressure vessel and upstream of a biotreatment reactor. In some embodiments the apparatus includes an input connected to receive waste water from a process for production of nitrobenzene, nitrotoluene or another aromatic nitrogen-containing compound.

In some embodiments, outflow is provided to a downstream biotreatment process. For example, the outflow may be neutralized and then passed to a stage providing a suitable combination of anoxic and aerobic biotreatment for denitrification. Neutralization may be performed, for example, by mixing the outflow in a suitable proportion with acidic waste water.

Where a component (e.g. a reactor, controller, assembly, device, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

EXAMPLES

The invention is further described with reference to the following specific examples, which are not meant to limit the invention, but rather to further illustrate it.

General

A synthetic waste was made using a mixture of mono-, di-, and tri-nitrophenols, which were dissolved to produce test solutions with around 1.0-1.3 wt % total nitrophenol salts. Different amounts of 25 wt % NaOH solution was then added to achieve a desired caustic strength. The BOD/COD for these starting solutions was about 0.02 and the BOD was found to increase with increased dilution of the test samples, which is indicative of a highly bio-toxic solution.

Example 1

A stirred 316 stainless steel autoclave was loaded with 189 g of a synthetic red water containing 1.07 wt % nitro-hydroxy-aromatic salts (0.12 wt % mono-nitrophenolate, 0.82 wt % di-nitrophenolate and 0.12 wt % tri-nitrophenolate) and 1.80 wt % NaOH. Nitrogen was bubbled through the solution and allowed to flush the reactor headspace, then the reactor was sealed and pressurized to 30 bar with nitrogen. The reactor was then heated to 300° C. within 14 minutes and held at 300° C. for 90 minutes. Liquid samples were removed periodically through a cooling loop and after each sample the loop was backflushed with nitrogen. It was found that the total nitro-hydroxy-aromatic content fell below the target 20 ppm 29 minutes after reaching 300° C. (or 43 minutes from start of heating). The feed solution had a theoretical COD of 11760 ppm and the solution at the end of the test had a COD of 4756 ppm or about 40% of the starting COD. The solution at the end of the test had a dark orange brown color with a BOD of 2465 ppm giving a BOD/COD ratio of 0.52. Nitrogen analysis was not carried out on this sample. Metals analysis showed <0.1 ppm chromium.

Example 2

A stirred 316 stainless steel autoclave was loaded with 189 g of a synthetic red water containing 1.07 wt % nitro-hydroxy-aromatic salts (0.12 wt % mono-nitrophenolate, 0.82 wt % di-nitrophenolate and 0.12 wt % tri-nitrophenolate) and 1.80 wt % NaOH. Oxygen was bubbled through the solution and allowed to flush the reactor headspace, then the reactor was sealed and pressurized to 23 bar with oxygen. The reactor was then heated to 300° C. within 16 minutes and held at 300° C. for 91 minutes. Liquid samples were removed periodically through a cooling loop and after each sample the loop was backflushed with oxygen and the reactor was re-pressurized to maintain a constant oxygen pressure of about 37 bar. It was found that the total nitro-hydroxy-aromatic content fell below the target 20 ppm 43 minutes after reaching 300° C. (or 59 minutes from start of heating). The feed solution had a theoretical COD of 11760 ppm and the solution at the end of the test had a COD of 1360 ppm or about 12% of the starting COD. The treated solution had a light blackish green color and contained about 84 ppm chromium. The solution had a BOD of 183 ppm and the BOD decreased with lower dilutions (i.e. higher sample concentrations) indicating a toxicity effect, likely due to the high level of chromium. Nitrogen analysis was not carried out on this sample.

Example 3

A stirred 316 stainless steel autoclave was loaded with 195 g of a synthetic red water containing 1.03 wt % nitro-hydroxy-aromatic salts (0.12 wt % mono-nitrophenolate, 0.79 wt % di-nitrophenolate and 0.12 wt % tri-nitrophenolate) and 2.58 wt % NaOH. Oxygen was bubbled through the solution and allowed to flush the reactor headspace, then the reactor was sealed and pressurized to 27 bar with oxygen. The reactor was then heated to 300° C. within 15 minutes and held at 300° C. for 90 minutes. Liquid samples were removed periodically through a cooling loop and after each sample the loop was backflushed with oxygen and the reactor was re-pressurized to maintain a constant oxygen pressure of about 40 bar. It was found that the total nitro-hydroxy-aromatic content fell below the target 20 ppm 19 minutes after reaching 300° C. (or 34 minutes from start of heating). The feed solution had a theoretical COD of 11370 ppm and the solution at the end of the test had a COD of 1360 ppm or about 12% of the starting COD. The treated solution had a light blackish green color and contained about 44 ppm chromium. The solution had a BOD of 124 ppm and the BOD decreased with lower dilutions indicating a toxicity effect, likely due to the high level of chromium. From a starting dissolved nitrogen of about 1384 ppm organic nitrogen, after oxidative treatment nitrogen analysis showed: 1059 ppm nitrite, 115 ppm nitrate, 48 ppm ammonia, and 1170 ppm total dissolved nitrogen leaving no dissolved organic nitrogen and 214 ppm nitrogen likely lost to the gas phase as nitrogen gas and some ammonia vapor.

Example 4

A stirred 316 stainless steel autoclave was loaded with 190 g of a synthetic red water containing 1.07 wt % nitro-hydroxy-aromatic salts (0.12 wt % mono-nitrophenolate, 0.82 wt % di-nitrophenolate and 0.12 wt % tri-nitrophenolate) and 1.79 wt % NaOH. Nitrogen was bubbled through the solution and allowed to flush the reactor headspace, then the reactor was sealed and pressurized to 30 bar with nitrogen. The reactor was then heated to 280° C. within 19 minutes and held at 280° C. for 98 minutes. Liquid samples were removed periodically through a cooling loop and after each sample the loop was backflushed with nitrogen. It was found that the total nitro-hydroxy-aromatic content fell below the target 20 ppm 48 minutes after reaching 280° C. (or 67 minutes from start of heating). The feed solution had a theoretical COD of 11760 ppm and the solution at the end of the test had a COD of 4755 ppm or about 40% of the starting COD. The treated solution had a dark red brown color with a BOD of 2533 ppm giving a BOD/COD ratio of 0.53. Nitrogen analysis was not carried out on this sample. Metals analysis showed <0.1 ppm chromium.

Example 5

A stirred 316 stainless steel autoclave was loaded with 188 g of a synthetic red water containing 1.29 wt % nitro-hydroxy-aromatic salts (0.13 wt % mono-nitrophenolate, 1.03 wt % di-nitrophenolate and 0.13 wt % tri-nitrophenolate) and 0.79 wt % NaOH. Nitrogen was bubbled through the solution and allowed to flush the reactor headspace, then the reactor was sealed and pressurized to 8 bar with nitrogen. The reactor was then heated to 295° C. within 20 minutes and held at 295° C. for 50 minutes. Liquid samples were removed periodically through a cooling loop and after each sample the loop was backflushed with nitrogen. It was found that the total nitro-hydroxy-aromatic content fell below the target 20 ppm 20 minutes after reaching 295° C. (or 40 minutes from start of heating). The feed solution had a theoretical COD of 14135 ppm and the solution at the end of the test had a COD of 5740 ppm or about 41% of the starting COD. The treated solution had a dark red brown color with a BOD of 3062 ppm giving a BOD/COD ratio of 0.53. From a starting dissolved nitrogen of about 1728 ppm organic nitrogen, after treatment nitrogen analysis showed: 1043 ppm ammonia, 30 ppm nitrite, 5 ppm nitrate, and 1196 ppm total dissolved nitrogen leaving approximately 118 ppm dissolved organic nitrogen and 532 ppm nitrogen likely lost to the gas phase as nitrogen gas and some ammonia vapor. Metals analysis showed <0.1 ppm chromium.

Example 6

A stirred 316 stainless steel autoclave was loaded with 198 g of a synthetic red water containing 1.06 wt % nitro-hydroxy-aromatic salts (0.12 wt % mono-nitrophenolate, 0.82 wt % di-nitrophenolate and 0.12 wt % tri-nitrophenolate) and 1.88 wt % NaOH. Oxygen was bubbled through the solution and allowed to flush the reactor headspace, then the reactor was sealed and the headspace pressurized to 6.6 bar with oxygen to provide a total oxygen loading of about 4.0 g/L or about 67% of the stoichiometric amount as given by Equation 3. The reactor was then heated to 280° C. within 21 minutes and held at 280° C. for 70 minutes. Liquid samples were removed periodically through a cooling loop and after each sample the loop was backflushed with nitrogen. It was found that the total nitro-hydroxy-aromatic content fell below the target 20 ppm 11 minutes after reaching 280° C. (or 32 minutes from start of heating). The feed solution had a theoretical COD of 11720 ppm and the solution at the end of the test had a COD of 4300 ppm or about 37% of the starting COD. The treated solution had a light tan color with a BOD of 2598 ppm giving a BOD/COD ratio of 0.60. Nitrogen analysis was not carried out on this sample. Metals analysis showed <0.1 ppm chromium.

Example 7

A stirred 316 stainless steel autoclave was loaded with 191 g of a synthetic red water containing 1.21 wt % nitro-hydroxy-aromatic salts (0.12 wt % mono-nitrophenolate, 0.97 wt % di-nitrophenolate and 0.12 wt % tri-nitrophenolate) and 2.31 wt % NaOH. Oxygen was bubbled through the solution and allowed to flush the reactor headspace, then the reactor was sealed and the headspace pressurized to 7.3 bar with oxygen to provide a total oxygen loading of about 5.0 g/L or about 85% of the stoichiometric amount as given by Equation 3. The reactor was then heated to 295° C. within 23 minutes and held at 295° C. for 60 minutes. Liquid samples were removed periodically through a cooling loop and after each sample the loop was backflushed with nitrogen. It was found that the total nitro-hydroxy-aromatic content fell below the target 20 ppm 11 minutes after reaching 295° C. (or 34 minutes from start of heating). The feed solution had a theoretical COD of 13250 ppm and the solution at the end of the test had a COD of 5255 ppm or about 40% of the starting COD. The treated solution had a light tan color with a BOD of 3089 ppm giving a BOD/COD ratio of 0.59. From a starting theoretical dissolved nitrogen of 1620 ppm organic nitrogen, after oxidative treatment solution nitrogen analysis showed: 8 ppm nitrite, 13 ppm nitrate, 179 ppm ammonia, and 270 ppm total dissolved nitrogen leaving approximately 70 ppm dissolved organic nitrogen. This leaves 1350 ppm of nitrogen lost to the gas phase as nitrogen gas and ammonia vapor, with this high value in this example likely due to inadequate system cooling before sampling leaving significant ammonia in the gas phase. Metals analysis showed <0.1 ppm chromium.

Example 8

A stirred 316 stainless steel autoclave was loaded with 192 g of a synthetic red water containing 1.26 wt % nitro-hydroxy-aromatic salts (0.13 wt % mono-nitrophenolate, 1.00 wt % di-nitrophenolate and 0.13 wt % tri-nitrophenolate) and 1.41 wt % NaOH. Oxygen was bubbled through the solution and allowed to flush the reactor headspace, then the reactor was sealed and the headspace pressurized to 7.9 bar with oxygen to provide a total oxygen loading of about 5.2 g/L or about 86% of the stoichiometric amount as given by Equation 3. The reactor was then heated to 300° C. within 25 minutes and held at 300° C. for 66 minutes. Liquid samples were removed periodically through a cooling loop and after each sample the loop was backflushed with nitrogen. It was found that the total nitro-hydroxy-aromatic content fell below the target 20 ppm 20 minutes after reaching 300° C. (or 45 minutes from start of heating). The feed solution had a theoretical COD of 13780 ppm and the solution at the end of the test had a COD of 5048 ppm or about 37% of the starting COD. The treated solution had a light tan color with a BOD of 3040 ppm giving a BOD/COD ratio of 0.60. From a starting dissolved nitrogen of about 1685 ppm organic nitrogen, after oxidative treatment nitrogen analysis showed: 1264 ppm ammonia, 18 ppm nitrite, 22 ppm nitrate, and 1307 ppm total dissolved nitrogen leaving approximately 3 ppm dissolved organic nitrogen and 378 ppm nitrogen likely lost to the gas phase as nitrogen gas and some ammonia vapor. Metals analysis showed 0.5 ppm chromium.

Example 9

A stirred 316 stainless steel autoclave was loaded with 189 g of a synthetic red water containing 1.26 wt % nitro-hydroxy-aromatic salts (0.13 wt % mono-nitrophenolate, 1.01 wt % di-nitrophenolate and 0.13 wt % tri-nitrophenolate) and 1.37 wt % NaOH. Oxygen was bubbled through the solution and allowed to flush the reactor headspace, then the reactor was sealed and the headspace pressurized to 8.2 bar with oxygen to provide a total oxygen loading of about 5.6 g/L or about 92% of the stoichiometric amount as given by Equation 3. The reactor was then heated to 300° C. within 24 minutes and held at 300° C. for 71 minutes. Liquid samples were removed periodically through a cooling loop and after each sample the loop was backflushed with nitrogen. It was found that the total nitro-hydroxy-aromatic content fell below the target 20 ppm 17 minutes after reaching 300° C. (or 41 minutes from start of heating). The feed solution had a theoretical COD of 13800 ppm and the solution at the end of the test had a COD of 5000 ppm or about 36% of the starting COD. The treated solution had a light tan color with a BOD of 2963 ppm giving a BOD/COD ratio of 0.59. From a starting dissolved nitrogen of about 1687 ppm organic nitrogen, after oxidative treatment nitrogen analysis showed: 1292 ppm ammonia, 32 ppm nitrite, 16 ppm nitrate, and 1321 ppm total dissolved nitrogen leaving no dissolved organic nitrogen and 366 ppm nitrogen likely lost to the gas phase as nitrogen gas and some ammonia vapor. Metals analysis showed 0.3 ppm chromium.

Example 10

A stirred 316 stainless steel autoclave was loaded with 181 g of a synthetic red water containing 0.96 wt % dinitro-cresol salt, 0.24 wt % nitro-cresol salt and 1.03 wt % NaOH. Nitrogen was bubbled through the solution and allowed to flush the reactor headspace, then the reactor was sealed and pressurized to 13.6 bar with nitrogen. The reactor was then heated to 295° C. within 21 minutes and held at 295° C. for 61 minutes. Liquid samples were removed periodically through a cooling loop and after each sample the loop was backflushed with nitrogen. It was found that the total nitro-hydroxy-aromatic content fell below the target 20 ppm 7 minutes after reaching 295° C. (or 28 minutes from start of heating). The feed solution had a theoretical COD of 15580 ppm and the solution at the end of the test had a COD of 10857 ppm or about 70% of the starting COD. The treated solution had a dark brown-black color with a BOD of 3034 ppm giving a BOD/COD ratio of 0.28. From a starting dissolved nitrogen of about 1413 ppm organic nitrogen, after treatment nitrogen analysis showed: 242 ppm ammonia, <2 ppm nitrite, 3 ppm nitrate, and 681 ppm total dissolved nitrogen leaving approximately 436 ppm dissolved organic nitrogen and 732 ppm nitrogen likely lost to the gas phase as nitrogen gas and some ammonia vapor. Metals analysis showed <2.8 ppm chromium.

Example 11

A stirred 316 stainless steel autoclave was loaded with 181 g of a synthetic red water containing 0.96 wt % dinitro-cresol salt, 0.24 wt % nitro-cresol salt and 1.03 wt % NaOH. Oxygen was bubbled through the solution and allowed to flush the reactor headspace, then the reactor was sealed and the headspace pressurized to 8.2 bar with oxygen to provide a total oxygen loading of about 6.4 g/L or about 70% of the stoichiometric amount as given by Equation 3. The reactor was then heated to 295° C. within 19 minutes and held at 295° C. for 61 minutes. Liquid samples were removed periodically through a cooling loop and after each sample the loop was backflushed with nitrogen. It was found that the total nitro-hydroxy-aromatic content fell below the target 20 ppm 10 minutes after reaching 295° C. (or 29 minutes from start of heating). The feed solution had a theoretical COD of 15576 ppm and the solution at the end of the test had a COD of 8483 ppm or about 55% of the starting COD. The treated solution had a dark red-brown color with a BOD of 4469 ppm giving a BOD/COD ratio of 0.53. From a starting dissolved nitrogen of about 1412 ppm organic nitrogen, after oxidative treatment nitrogen analysis showed: 131 ppm ammonia, <2 ppm nitrite, 7 ppm nitrate, and 261 ppm total dissolved nitrogen leaving approximately 123 ppm dissolved organic nitrogen and 1151 ppm nitrogen likely lost to the gas phase as nitrogen gas and some ammonia vapor. Metals analysis showed <1 ppm chromium.

Example 12

A stirred 316 stainless steel autoclave was loaded with 190 g of a synthetic red water containing 1.06 wt % nitro hydroxy aromatic salts (0.12 wt % mono-nitrophenolate, 0.82 wt % di-nitrophenolate and 0.12 wt % tri-nitrophenolate) and 1.87 wt % NaOH. Oxygen was bubbled through the solution and allowed to flush the reactor headspace, then the reactor was sealed and the headspace pressurized to 7.7 bar with oxygen to provide a total oxygen loading of about 4.0 g/L or about 67% of the stoichiometric amount as given by Equation 3. The reactor was then heated to 265° C. within 17 minutes and held at 265° C. for 70 minutes. Liquid samples were removed periodically through a cooling loop and after each sample the loop was backflushed with nitrogen. It was found that the total nitro hydroxy aromatic content fell below the target 20 ppm 27 minutes after reaching 265° C. (or 44 minutes from start of heating). The feed solution had a theoretical COD of 11725 ppm and the solution at the end of the test had a COD of 4400 ppm or about 38% of the starting COD. The treated solution had a tan color with a BOD of 2447 ppm giving a BOD/COD ratio of 0.56. From a starting dissolved nitrogen of about 1428 ppm organic nitrogen, after oxidative treatment solution nitrogen analysis showed: 54 ppm nitrite, 9 ppm nitrate, 76 ppm ammonia, and 190 ppm total dissolved nitrogen leaving approximately 51 ppm dissolved organic nitrogen. This leaves 1239 ppm of nitrogen lost to the gas phase as nitrogen gas and ammonia vapor, with this high value in this example likely due to inadequate system cooling before sampling leaving significant ammonia in the gas phase. Metals analysis showed <0.1 ppm chromium.

Thus, it can be seen that the use of the disclosed conditions was found to provide successful treatment of the nitro-hydroxy-aromatic compounds and additionally bring about a decrease in COD and dissolved nitrogen and an improvement in bio-treatability (BOD/COD), thus reducing the downstream biotreatment requirements. The method is also compatible with the use of lower cost stainless steel alloys.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A process for treating wastewater containing a nitro-hydroxy-aromatic compound using sub-critical conditions comprising the steps of:
    adjusting the wastewater to be treated to contain excess hydroxide equivalent to greater than three moles of free hydroxide per mole of total nitro-hydroxy-aromatic compounds; and
    supplying a sub-stoichiometric amount of an oxidant to the wastewater.

2. A process according to claim 1, wherein the hydroxide is sodium hydroxide.

3. A process according to claim 1, wherein the excess hydroxide is equivalent to greater than four moles of free hydroxide per mole of total nitro-hydroxy-aromatic compounds.

4. A process according to claim 1, wherein the oxidant is oxygen.

5. A process according to claim 4, wherein the operating pressure is sufficient to fully dissolve the added oxygen and maintain a single phase.

6. A process according to claim 1, wherein the operating pressure is between 80 bar and 180 bar.

7. A process according to claim 1, wherein the oxidant is air.

8. A process according to claim 1, wherein the oxidant is hydrogen peroxide.

9. A process according to claim 8, wherein the system operating pressure is selected to keep fully dissolved any oxygen resulting from hydrogen peroxide decomposition to maintain a single phase.

10. A process according to claim 1, wherein the oxidant is nitrite.

11. A process according to claim 1, wherein the process is conducted within a reactor fabricated from or lined with stainless steel.

12. A process according to claim 1, wherein the wastewater results from the production of nitrobenzenes.

13. A process according to claim 12, wherein the nitrobenzenes comprise mononitrobenzene or dinitrobenzene.

14. A process according to claim 1, wherein the wastewater results from the production of nitrotoluenes.

15. A process according to claim 14, wherein the nitrotoluenes comprise mononitrotoluene, dinitrotoluene or trinitrotoluene.

16. A process according to claim 1, wherein the process is conducted at a temperature between 200° C. and 350° C.

17. A process according to claim 1, wherein the process is conducted at a temperature between 240° C. and 320° C.

18. A process according to claim 16, wherein the temperature between 200° C. and 350° C. is maintained for 15 to 50 minutes.

19. A process according to claim 1, wherein the oxidant is supplied in an amount equivalent to 30% to 99% of the stoichiometric amount as given by the formula $[O_2]=7[NPs]-2[R—NO_2]$ for nitro-phenol salts, or by $[O_2]=8.5[NPs]-2[R—NO_2]$ for nitro-cresol salts, where $[O_2]$ is the oxygen concentration, [NPs] is the total concentration of nitro-phenol or nitro-cresol salts, and $[R—NO_2]$ is the total concentration of nitro groups on the nitro-hydroxy-aromatic compounds.

20. A process according to claim 1, wherein the oxidant is supplied in an amount equivalent to 50% to 95% of the stoichiometric amount as given by the formula $[O_2]=7[NPs]-2[R—NO_2]$ for nitro-phenol salts, or by $[O_2]=8.5[NPs]-2[R—NO_2]$ for nitro-cresol salts, where $[O_2]$ is the oxygen concentration, [NPs] is the total concentration of nitro-phenol or nitro-cresol salts, and $[R—NO_2]$ is the total concentration of nitro groups on the nitro-hydroxy-aromatic salts.

21. A process according to claim 1, wherein the oxidant is supplied in an amount equivalent to 67% to 95% of the stoichiometric amount as given by the formula $[O_2]=7[NPs]-2[R—NO_2]$ for nitro-phenol salts, or by $[O_2]=8.5[NPs]-2[R—NO_2]$ for nitro-cresol salts, where $[O_2]$ is the oxygen concentration, [NPs] is the total concentration of nitro-phenol or nitro-cresol salts, and $[R—NO_2]$ is the total concentration of nitro groups on the nitro-hydroxy-aromatic salts.

22. A process according to claim 20, wherein the process is conducted at a temperature between 240° C. and 320° C.

23. A process according to claim 1, further comprising a downstream biotreatment process.

24. A process according to claim 1, further comprising a step of ammonia stripping followed by a step of biological treatment.

* * * * *